United States Patent [19]
Ushijima et al.

[11] Patent Number: 5,594,426
[45] Date of Patent: Jan. 14, 1997

[54] NETWORK STATION AND NETWORK MANAGEMENT SYSTEM

[75] Inventors: Kazuhiro Ushijima, Kanagawa-ken; Hisashi Matsumura, Odawara; Fumiaki Matsuura, Ebina, all of Japan

[73] Assignees: Hitachi, Ltd., Tokyo; Hitachi Software Engineering Co., Ltd, Yokohama, both of Japan

[21] Appl. No.: 309,414

[22] Filed: Sep. 20, 1994

[30] Foreign Application Priority Data

Sep. 20, 1993 [JP] Japan .................................. 5-232841

[51] Int. Cl.⁶ .................................................. H04L 12/24
[52] U.S. Cl. ................... 340/825.02; 340/825.16; 395/750; 364/138; 364/188; 370/445
[58] Field of Search ................... 340/825.08, 825.16, 340/825.17, 827, 825.02, 825.03, 825.05; 395/159, 161, 750; 364/138, 188; 370/85.3, 85.8

[56] References Cited

U.S. PATENT DOCUMENTS

| | | | |
|---|---|---|---|
| 4,809,163 | 2/1989 | Hirosawa et al. | 364/200 |
| 5,038,140 | 8/1991 | Ikeuchi | 340/825.02 |
| 5,117,430 | 5/1992 | Berglund | 340/825.02 |
| 5,226,120 | 7/1993 | Brown et al. | 395/200.11 |
| 5,243,335 | 9/1993 | Kato et al. | 340/825.05 |
| 5,261,044 | 11/1993 | Dev et al. | 395/159 |
| 5,287,343 | 2/1994 | Nakamura et al. | 340/825.02 |
| 5,295,244 | 3/1994 | Dev et al. | 395/161 |
| 5,311,515 | 5/1994 | Henderson et al. | 340/825.08 |
| 5,450,408 | 9/1995 | Phaal | 340/825.02 |

FOREIGN PATENT DOCUMENTS 2128388  4/1984  United Kingdom .............. 340/825.03

OTHER PUBLICATIONS

IBM Technical Disclosure Bulletin, "Power Control Network Command/Response Structure" vol. 34, No. 5,(Oct. 1991), pp. 3–8.

Primary Examiner—Michael Horabik
Assistant Examiner—William H. Wilson, Jr.
Attorney, Agent, or Firm—Antonelli, Terry, Stout & Kraus

[57] ABSTRACT

A network management system includes network stations each having a power source and a power switch to turn the power source on and off, a network management station to monitor the network stations, and a communication network enabling connections between the network stations and the network management station. When turned off by the power switch, the network station enables communication with the network management station and then sends an event to notify the power-off state thereto. This enables the network management system to display whether the communication failure is caused by a network failure or the power-off of the network station.

23 Claims, 12 Drawing Sheets

NETWORK STATION AND NETWORK MANAGEMENT SYSTEM

BACKGROUND OF THE INVENTION

The present invention relates to a network management system in which network stations connected to a network are managed by a network management station, and in particular, to a network management method in which a power-off operation of a network station is monitored by the network management station.

There has been known a conventional technology of managing a network in which a network management station issues at a fixed interval inquiries to network stations for such information as operational states and failures thereof such that each network station sends a response to the network management station.

The prior art is achieved on assumption that the network stations are kept powered and are normally operating in any situation. When a failure occurs in a data line, the inquiry from the network management station to each network station as well as the response from the network station to the network management station cannot be normally achieved. The network management station therefore notifies that communications between the network management station and the network stations have been interrupted.

Due to the assumption that the network stations are kept powered in the system operation, there has been a problem that when the network management station notifies the interruption of communication as above, it is impossible to decide whether there occurred a failure in the data line or a power-off operation in a network station.

A technology of notifying the power-off of a network station has been described in the JP-A-2-283141. However, a function to identify a partner to which the notification is to be sent is missing in this technology, this consequently leads to a problem that it cannot be guaranteed that the event of power-off is actually notified to a desired destination. According to the prior art, in a network having a complex structure, a broadcast message of a power-off event is transmitted to all terminals in the network. This is associated with a problem of increase in traffic load imposed on the network.

As described above, the conventional technology is attended with a problem that the network management station cannot discriminate between an event that a network station connected to the network cannot achieve communication due to a failure of a data line and an event that the interruption of communication is caused because the network station is turned off.

Particularly, in a system including a public or global network, when the network is managed by a particular network management station, there arises a problem. Namely, to achieve notification of the power-off event, each network station is required to have a function to identify the network management station.

SUMMARY OF THE INVENTION

It is therefore an object of the present invention to provide a network management system capable of improving network managing functions of the network management station, thereby solving the problems of the prior art.

In accordance with the present invention, the object is achieved as follows. When a network station is turned off, the power-off state is notified to a particular network management station such that the power-on and power-off states of network stations are displayed by the network management station. For this purpose, a mechanism or unit to identify a destination of notification and a unit to report the power-off state are disposed in the network station, and a function to output or report the power-off and power-on states is added to the network management station.

The network station includes a communication unit for the network, a communication unit for the network management station, and a power-off control unit to notify a power-off report to the network management unit before turning power of its own off. The network management station includes a network management unit including a screen display unit, a communication unit for the network, an inquiry unit or a network polling check unit for network stations, and an event receiver to receive an event from the network stations.

In the power-off operation, the network station creates an event representing the power-off operation thereof by the power control unit, identifies the network management station as the destination of the event by the notification control unit, and sends the state of power thereof to the network management station. Receiving the report by the event receiver, the network management unit presents the event on the screen by the display unit.

According to the present invention as described above, the power-off of the network station can be clearly discriminated from the failure of the data line. Consequently, it is possible to appropriately cope with a network failure at a high speed.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to the accompanying drawings, description will be given of an embodiment of the network management system according the present invention.

Figure 1:
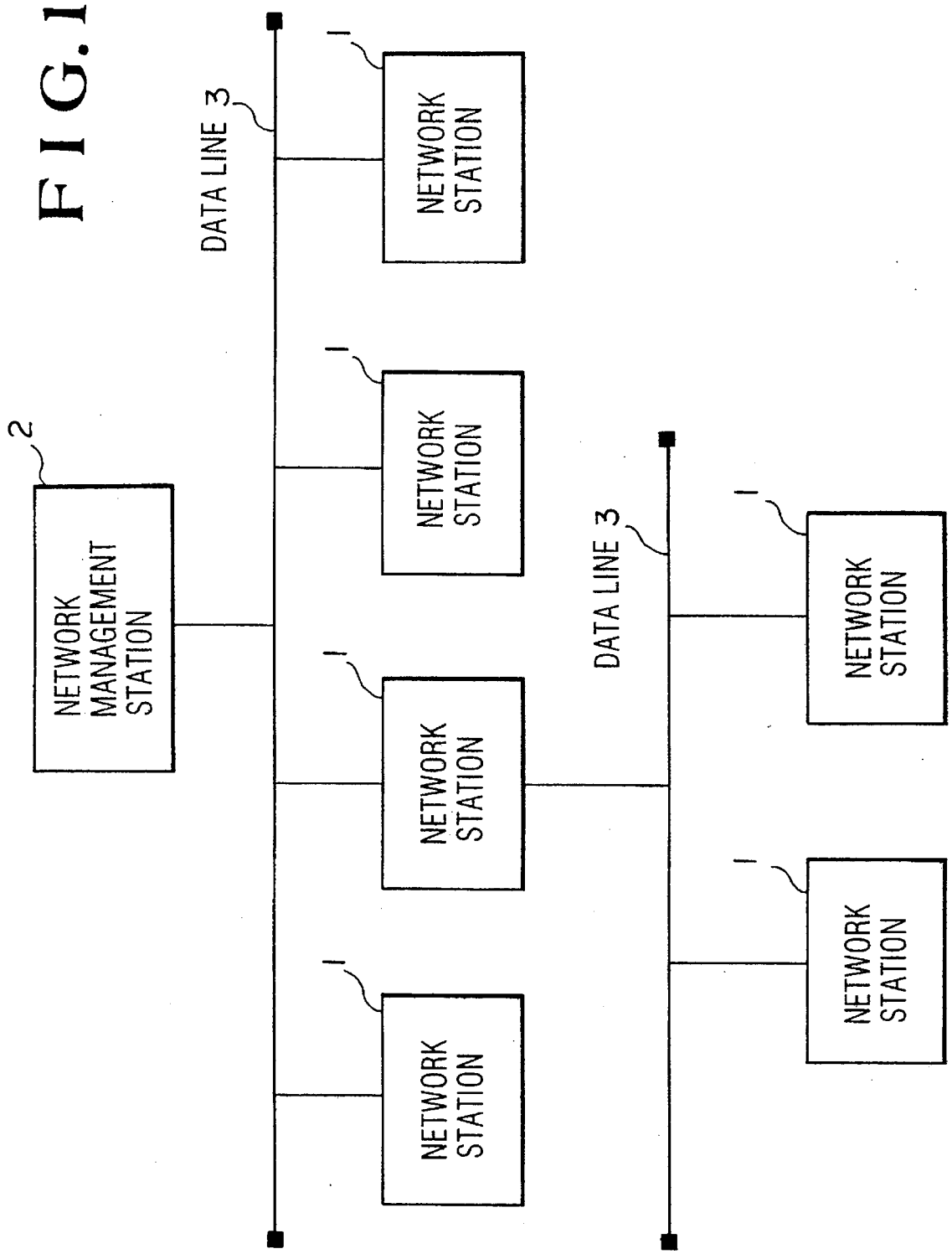
FIG. 1 is a schematic diagram showing the system configuration of a network management system in an embodiment according to the present invention.

The structure of FIG. 1 includes network stations 1, a network management stat on 2, and a data line 3. The data line 3 include, for example, a local area network (LAN) such as a carrier sense multiple access with collision detection (CSMA/CD) LAN, namely, a communication network to establish connections between a plurality of network stations 1 and the network management station 2.

The network management station 2 has a function to periodically issues polling items or inquiries to each network station 1 for information such as an operation state and a failure thereof. The network station 1 has various functions such as a function to send a reply to the inquiry and a function to report an event or the like representing a change in its state to the network management station 2. At the power-on or power-off stage, the network station 1 identifies the network management station 2 to establish connection to the identified station 2 and then notifies the power-on or power-off state.

Figure 12:
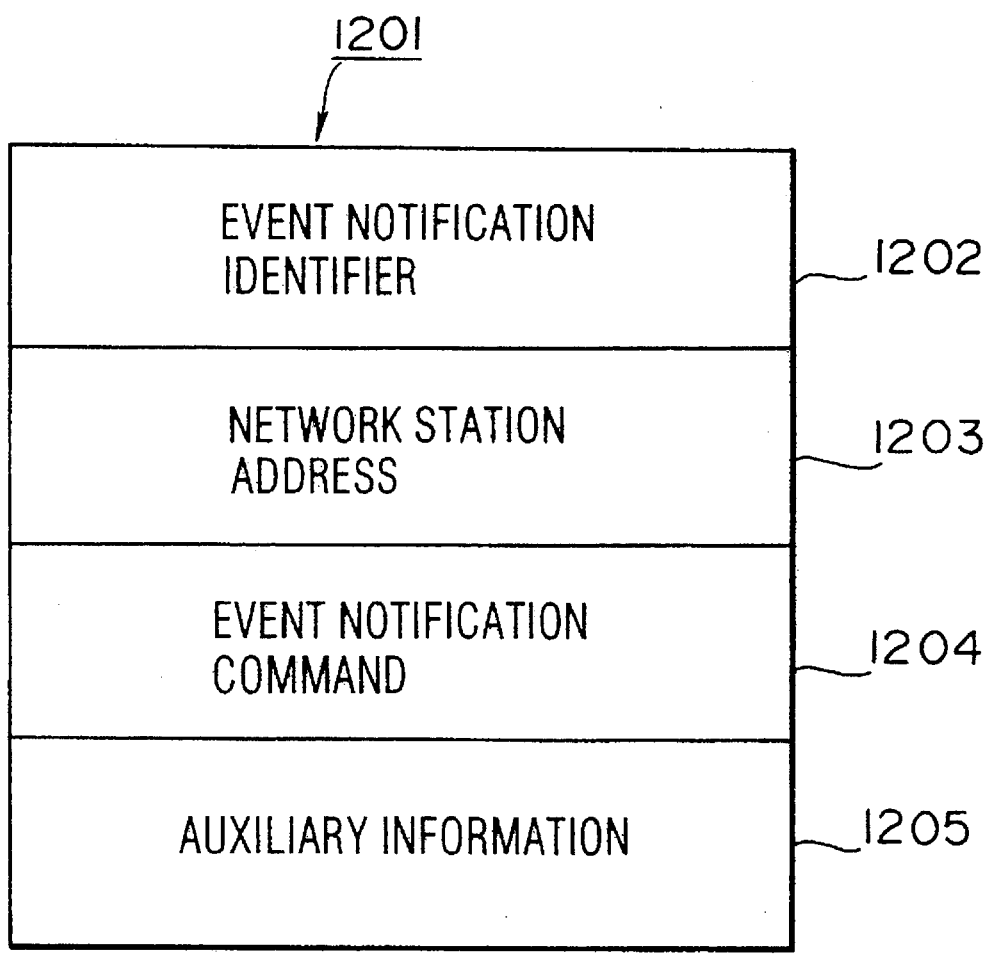
FIG. 12 is a diagram showing an example of an event message transmitted from the net work station to the network management station.

Referring next to FIG. 12, description will be given of an example of the data format of an event reported from the network station 1 to the network management station 2 as described above.

An event message 1201 includes an event notification identifier 1202, a network station address 1203, an event notification command 1204, and auxiliary information 1205. The identifier 1202 is identification data to discriminate ordinary data such as communication data, inquiry data, or response data from event notification data. The address 1203 is address information to identify a network station 1. The command 1204 indicates identification data to discriminate a power-on report from a power-off report. The auxiliary information 1205 is information to be sent to the network management station 2 in the power-on or power-off operation or when a response is sent to an inquiry from the network management station 2. For example, the information 1205 indicates a period of time of occurrence of the event 1201.

Figure 2:
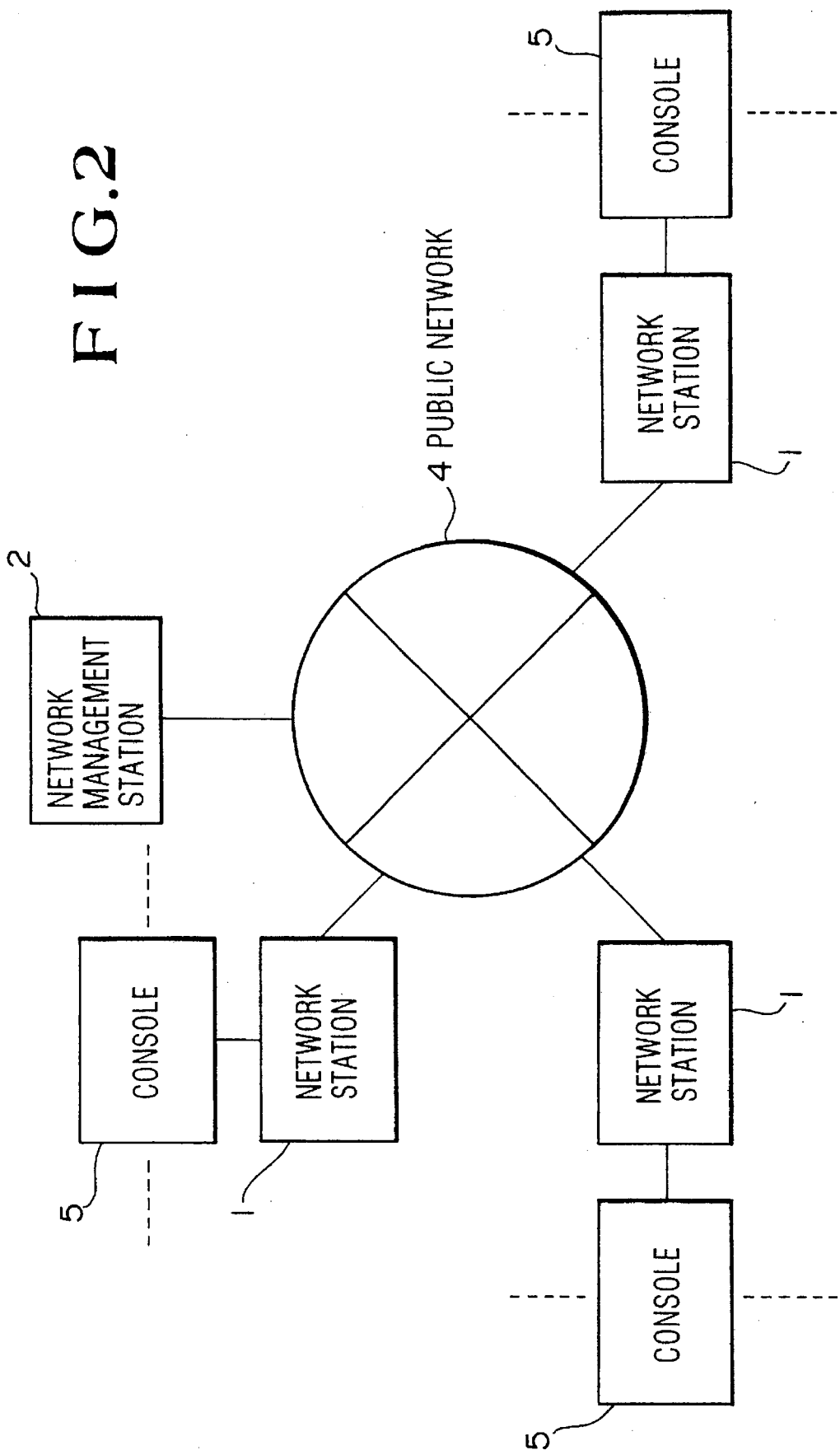
FIG. 2 is a diagram schematically showing another embodiment of the network management system according to the present invention.

FIG. 2 schematically shows another embodiment of the network management system in accordance with the present invention. This embodiment includes a public network 4 as a communication network to connect the network stations 1 to the network management station 2. As the public network 4, there has been known, for example, the integrated services digital network (ISDN). The network station 1 is also called "terminal adapter".

In the configuration of FIG. 2, a console 5 is not provided with any unit to directly establish connection to the communication network (to be simply called a network). Consequently, to communicate with another console 5 via the public network 4, the console 5 is connected to the network station 1 to achieve communications therethrough. When communication is desired to be started, the console 5 issues a communication start request to the network station 1, which then achieves a call initiation to a destination network station 1 (to establish connection therebetween). As a result, there is enabled communications for the console 5. Since the global network is a system to carry out a one-to-one communication between one terminal unit and another terminal unit, the network station 1 supports a function of the one-to-one communication. In the system, as described above, the network management station 2 is issuing calls to each network station 1 at a fixed interval to collect the states of the network station 1. At the power-off stage, the network station 1 achieves a call initiation to a network management station 2 indicated by initial information beforehand memorized therein so as to establish connection via the public network 4 to the network management station 2. After the network station 1 is completely connected to the network management station 2, the power-off notification is effected.

Figure 3:
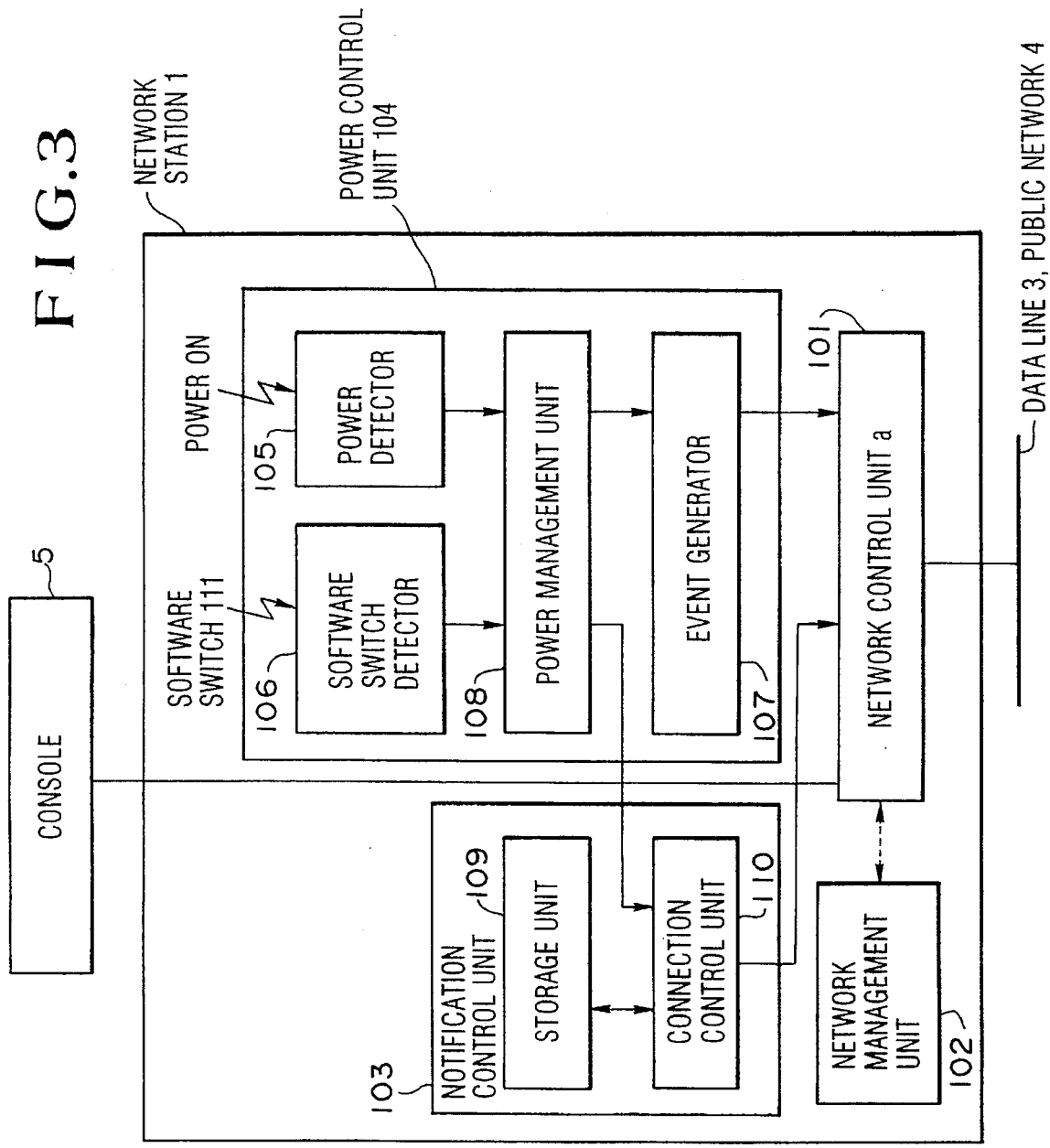
FIG. 3 is a diagram showing the internal construction of a network station of the embodiments above.

FIG. 3 shows in a block diagram the internal configuration of the embodiment of the network station 1 of FIG. 2.

In the structure of FIG. 3, the network station 1 includes a network control unit a 101 to enable communications with the data line 3 or the public network 4 (to be collectively called also as a communication network), a network management unit 102 to send a reply including information of the state of the network station 1 in response to an inquiry from the network management station 2, a notification control unit 103 to identify the network management station 2 to which the reply of state information is transmitted, and a power control unit 104 to manage the power source supplying power to the network station 1. The respective constituent units are electrically connected to each other as shown in FIG. 3.

The power control unit 104 includes a power detector 105 to sense the power-on state, a software switch detector 106 to detect notification from a software switch, an event generator 107 to notify various events 1201 to the network management station 2, and a power management unit 108 to generate the events 1201 and to control the power detector 106, the software switch detector 106, and the event generator 107. The notification control unit 103 includes a storage unit 109 to store therein an existing position (such as an address or a call initiation number) of the network management station 2 and a connection control unit 110 to establish connection to the network management station 2. These constituent element are also electrically connected to each other as shown in FIG. 3.

Description has been briefly given of the functional configuration of the network station 1 by reference to FIG. 3. Next, the hardware structure thereof will be described by referring to FIG. 4.

The hardware system of the network station 1 includes a central processing unit (CPU) 6, a memory 109a or a disk 109b, a communication processor 7, a power source 8, and a bus 41 connecting these components to each other. The communication processor 7 is further linked with a communication network (including a data line 3 and a public network 4). The system configuration additionally includes a power switch 9 connected via signal lines 42 and 43 to the CPU 6 and the power supply 8, respectively. The power source 8 supplies power via power lines, not shown, to the CPU 6, the memory 109a or the disk 109b, and the communication processor 7.

In the network station 1, the CPU 6 achieves data operations for the memory 109a or the disk 109b and controls the communication processor 7 and the power source 8 via the bus 41.

The CPU 6 includes therein a program to control the network station so as to conduct predetermined operations in response to an interruption signal (via the signal line 42) and notification from the communication processor 7 (via the bus 41).

The power source 8 supplies as described above, power to the network station 1 to start the power supply operation on receiving an interruption signal from the power switch 9 via the signal line 43 and to stop the power supply operation in response to a pertinent indication from the CPU 6 via the bus 41.

The communication processor 7 is responsive to a command indication from the CPU 6 (via the bus 41) to communicate data with the communication network. On receiving a command indication from the CPU 6, the communication processor 7 sends or receives data to or from the network and then reports a result of the operation to the CPU 6 (via the bus 41). The communication processor 7 has moreover a function responsive to an inquiry or polling item from the network management station 2 to send a reply notifying the current information thereof.

Figure 4:
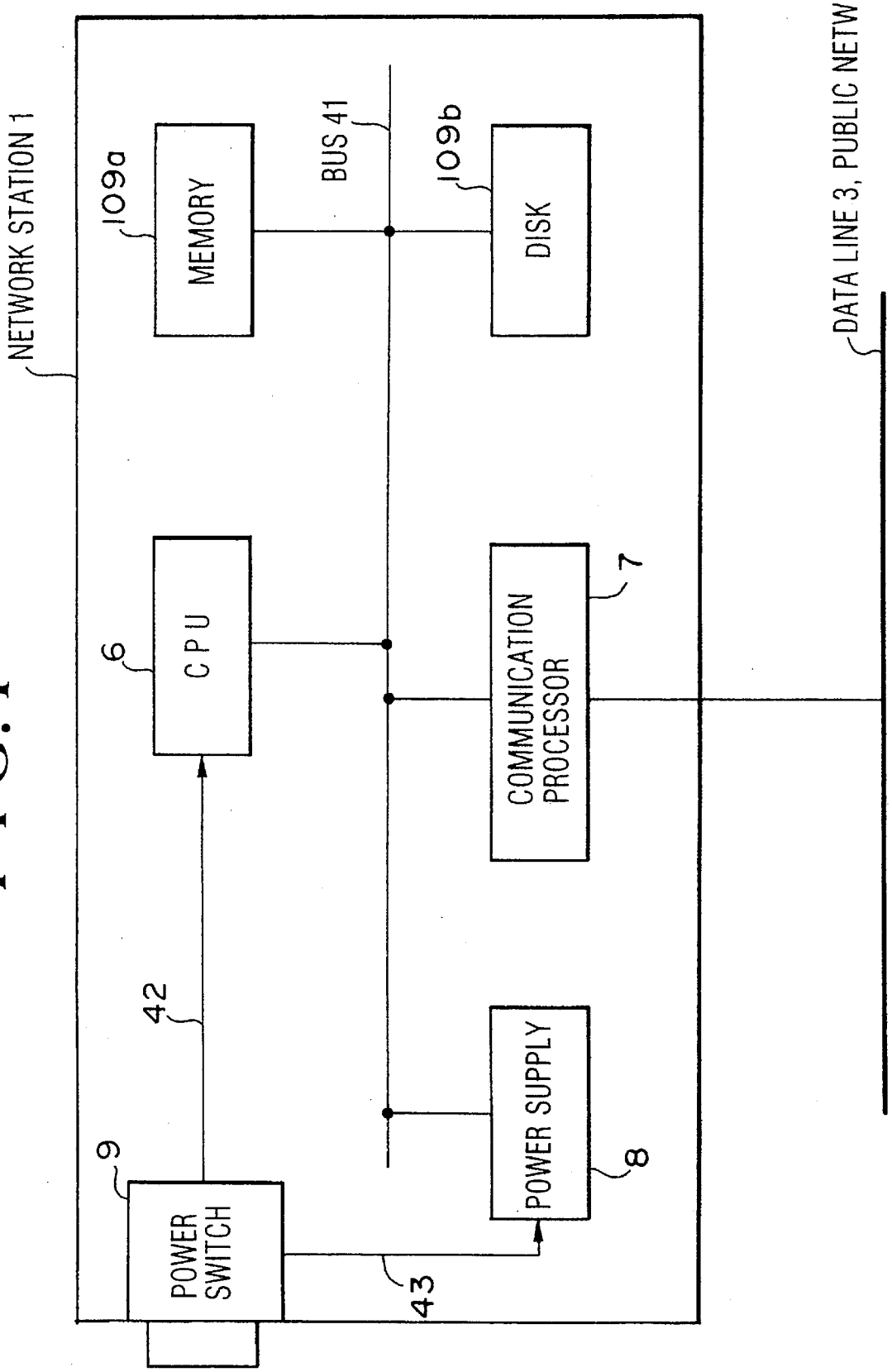
FIG. 4 is a diagram showing the hardware structure of the network station.

Collating the functional block diagram of FIG. 3 with the hardware structure of FIG. 4, description will be given of specific operations of the network station 1. The CPU 6 includes therein programs respectively associated with the power control unit 104 and the connection control unit 110. The memory 109a or the disk 109b constitute a storage unit 109. The communication processor 7 includes programs respectively related to the network management unit 102 and the network control unit a 101.

At the power-on stage, an interruption signal is sent from the power switch 9 to the CPU 6, whereas, in the power-off step, operation is effected as follows.

The CPU 6 is capable of monitoring the power switch 9. When the switch 9 is turned off, an interruption signal is transmitted therefrom to the CPU 6 via the signal line 42. In response to the interruption signal, the CPU 6 executes processing to create an event 1201 representing the power-off state. Subsequently, the CPU 6 acquires information of the partner (an address of the network management station) from the memory 109a or the disk 109b to sends the information of destination together with a connection request (command) via the bus 41 to the communication processor 7. On receiving the command, the processor 7 connects the network station 1 to the network management station 2. When the connection is completely established, the communication processor 7 sends a report of the prepared connection to the CPU 6. If the operation has been successfully finished, the CPU 6 transmits the produced event 1201 to the communication processor 7 together with an indication to send the event to the partner or destination. When the transmission processing is terminated, the communication processor 7 reports a transmission result indicating that the event is sent to the CPU 6. When the transmission result is received, the CPU 6 instructs the power supply 8 (via the bus 41) to turn power off. As a result, power of the network station 1 is interrupted (first method).

Discontinuation of power supply to the network station 1 may be more efficiently achieved as follows. The communication processor 7 awaits reply from the partner without reporting the transmission result to the CPU 6. Only when a reply signal is received in response thereto, the processor 7 reports the condition to the CPU 6, which in turn instructs the power source 8 to turn power off (second method).

In these power-off methods, the first method is advantageous in that the period of time necessary for the processing in the whole system is minimized, whereas the second method is effective in than the the power-off operation becomes much more guaranteed.

Figure 5:
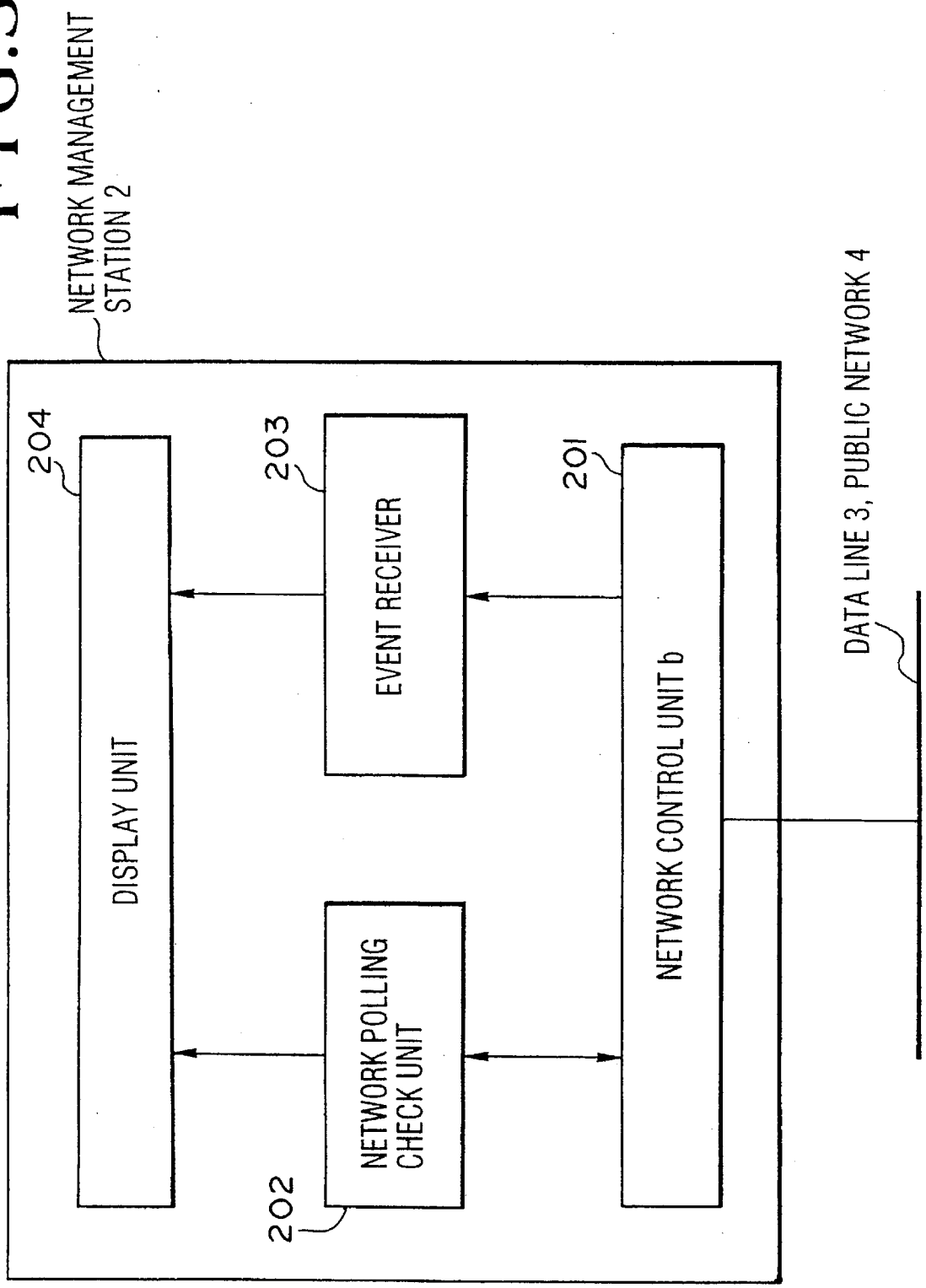
FIG. 5 is a diagram showing the internal structure of a network management station of the embodiments above.

FIG. 5 shows in a block diagram the internal configuration of the network management station 2 of FIGS. 1 and 2. The structure includes a network control unit b 201 to control communications with the data line 3 or the public network 4, a network polling check unit 202 to issue inquires or polling to the network stations 1, an event receiver 203 to receive events 1201 from the network stations 1, and a display unit 204 to represents states of network stations 1 according to the events therefrom. The constituent elements are electrically coupled with each other as shown in FIG. 5.

Figure 6:
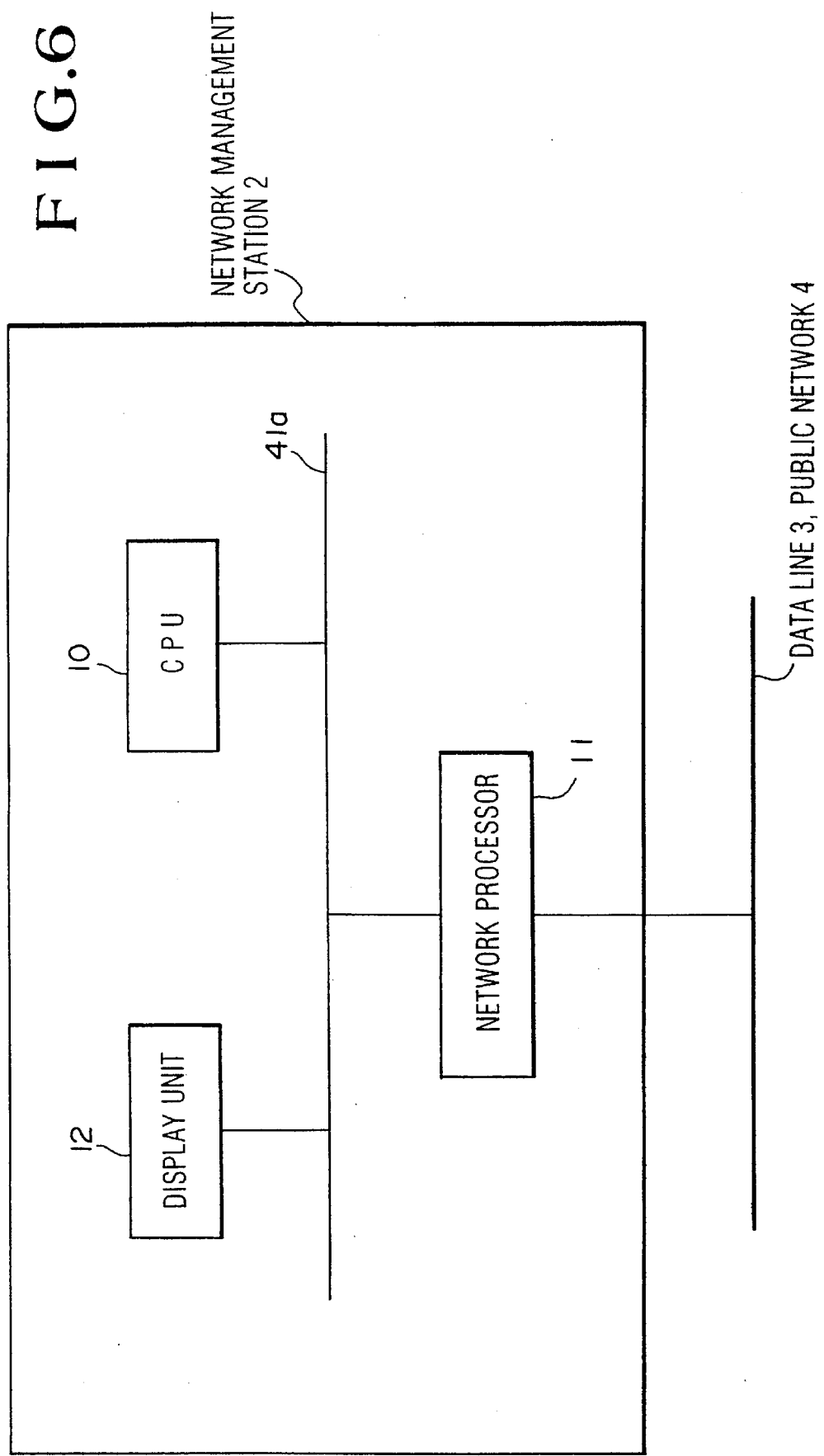
FIG. 6 is a diagram showing the hardware constitution of the network management station.

FIG. 6 shows the hardware construction of the network management station 2 including a CPU 10, a network processor 11, and a display 12 which are connected to each other via a bus 41a. Referring to FIGS. 5 and 6, the CPU 10 includes programs respectively related to the network polling check unit 202, the event receiver 203, and the display unit 204, whereas the network processor 11 is provided with a program associated with the network control unit b 201. The display 12 presents thereon a screen image in response to an indication from the display unit 204.

Figure 7:
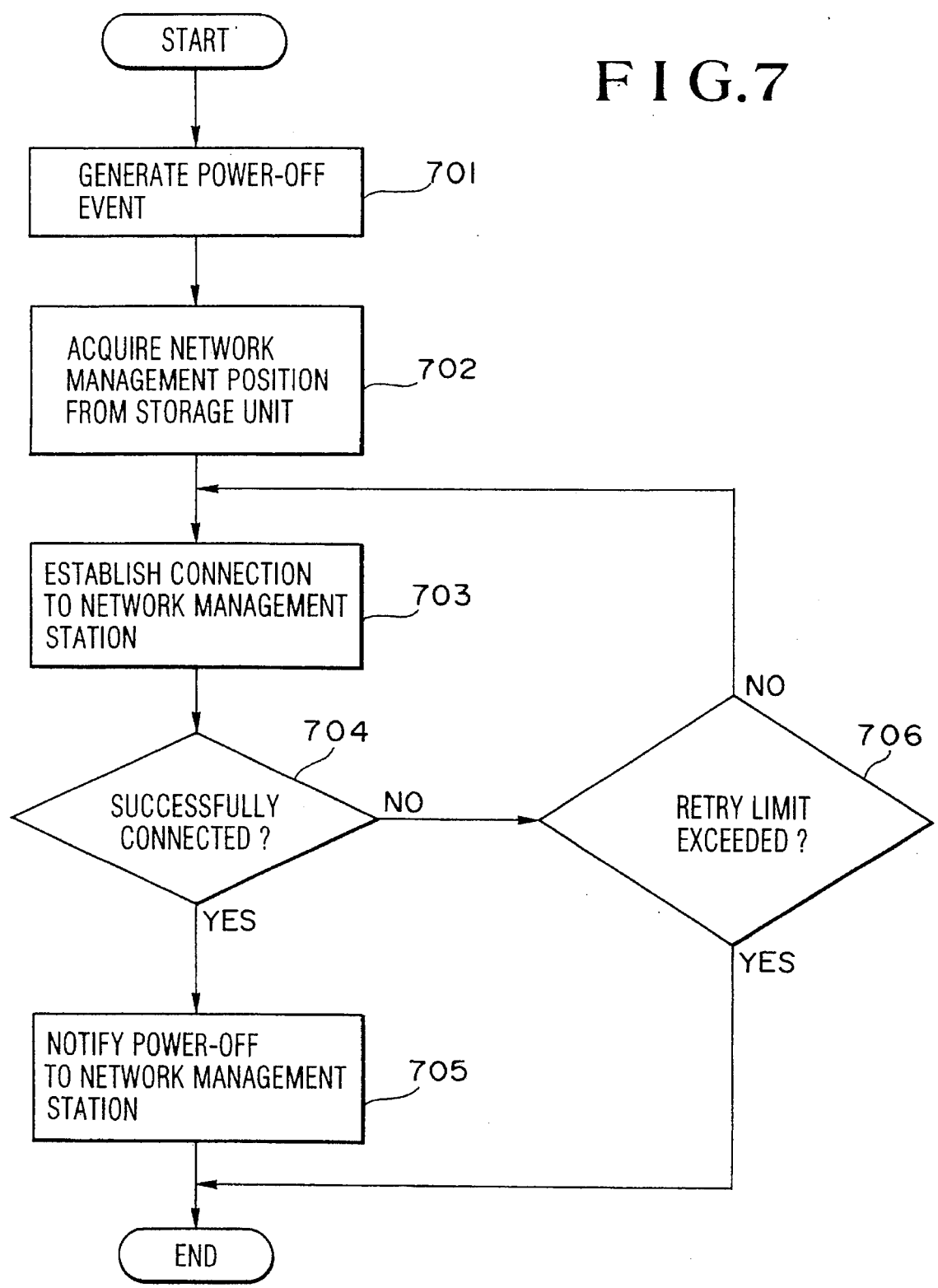
FIG. 7 is a flowchart showing the processing procedure of the network station in a power-off operation.

Operation of the network management station 2 will be described later. Referring now to FIGS. 3 and 7, description will be given of operation of the station 2 in the power-off stage.

On receiving a power-off request 111 via the software switch, the power control unit 104 operates as follows.

(1) The software switch detector 106 senses a request and then passes the sense result to the power management unit 108. This unit 108 generates in response thereto an event 1201 (FIG. 12) indicating a power-off operation by the software witch (step 701) and then reports to the notification control unit 103 a generation end signal denoting that he event message 1201 is completely created.

(2) According to the notification from the power management unit 108, the connection control unit 110 of the notification control unit 103 accesses the storage unit 109 such as a memory or a file to acquire therefrom an existing address of a desired network management station 2 and then issues a connection request to the network control unit a 101 to establish connection to the network management station 2 (step 702).

(3) The network control unit a 101 establishes connection via the data line 3 or the global network 4 to the network management station 2 (step 703).

(4) When the connecting attempt is successfully finished, the system transmits the event 1201 generated in step 701 to the event notification unit or the event generator 107. The generator 107 then notifies event 1201 via the network control unit a 101 to the network management station 2 (steps 704 and 705).

(5) when the connection attempt fails in step 703, the system reports the failed condition to the connection control unit 110, which then conducts retries for connection according to the retry count memorized in the storage unit 109 (step 706).

Through the operations described above, the event 1201 denoting the power-off state of the network station 1 can be notified to the network management station 2. In a case where the network station 1 cannot be successfully connected to the network management station 2 even when the retry for connection is attempted exceeding the specified retry count, there can be recognized a network failure.

As described above in conjunction with the hardware structure of the network station 1, there have been provided two methods of interrupting power to the network station 1. According to the first method, the event generator 107 supplies the power management unit 108 with notification indicating the termination of output of the event 1201 to the network control unit a 101 such that the power control unit 108 instructs the power source 8 of FIG. 4 to turn power off. As for the second method, when a reply from the network management station 2 is received, the event notification unit or the event generator 107 sends a response signal to the power management unit 108, which in turn indicates the power source 8 of FIG. 4 to interrupt power.

Figure 8:
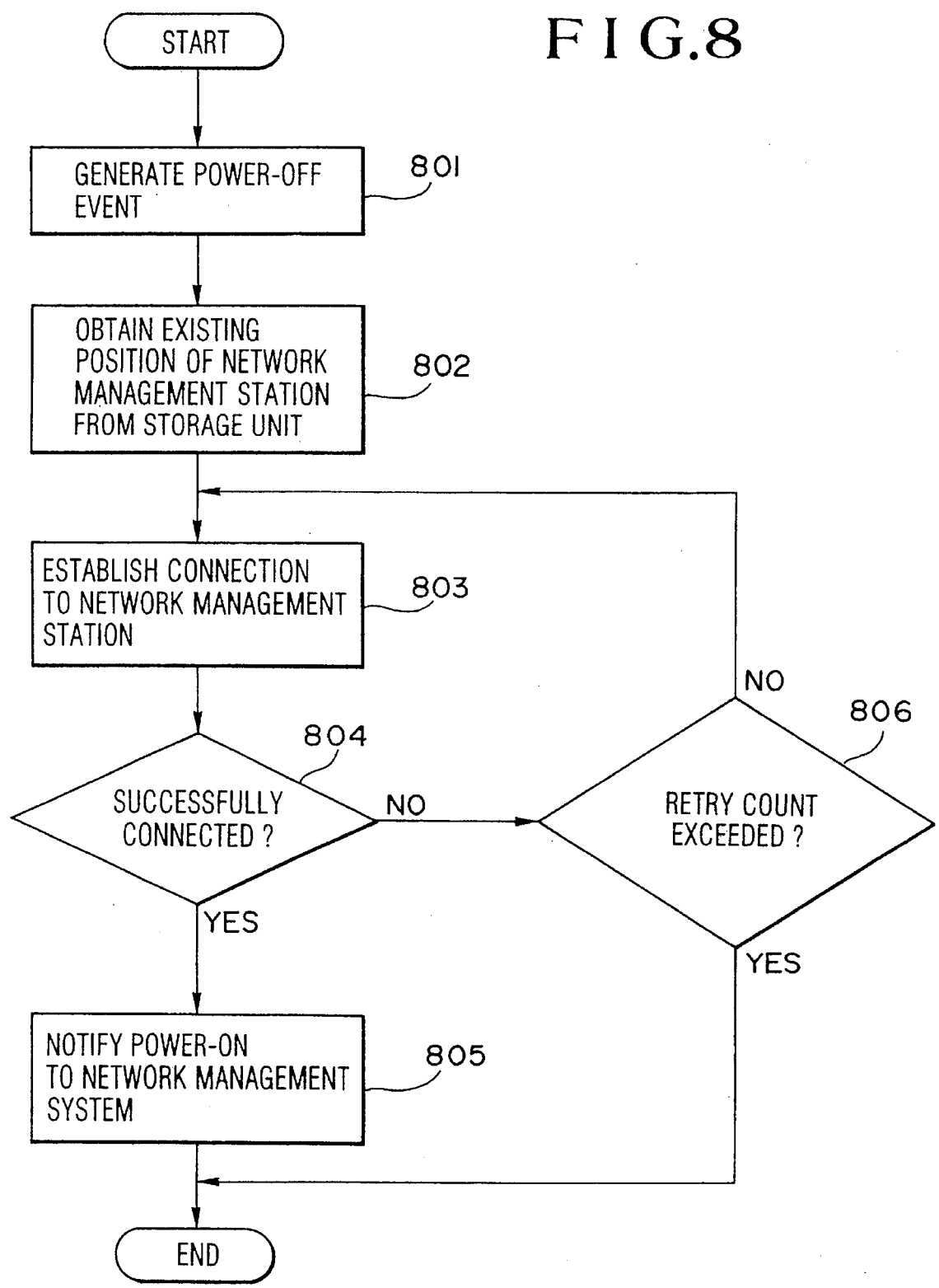
FIG. 8 is a flowchart showing the processing procedure of the network station in a power-on operation.

Referring now to FIGS. 3 and 8, description will be given of the power-on stage (to turn the network station 1 on).

The power control unit 104 senses the power-on operation by the power detector 105 and then conducts the following operation.

(1) According to the report from the power detector 105 the power management unit 108 produces an event item 1201 designating the power-on state (step 801).

(2) In response to the notification from the power management unit 108, the connection control unit 110 of the notification control unit 103 accesses the storage unit 109 to attain an existing position of the network management station 2 and then issues request to the network control unit a 101 to establish connection to the network management station 2 (step 802).

(3) The network control unit a 101 establishes connection via the data line 3 or the public network 4 to the network management station 2 (step 803).

(4) When the connecting attempt is successfully terminated, the system transmits the event 1201 generated in step 801 to the event generator 107 so as to notify event 1201 via the network control unit a 101 to the network management station 2 (steps 804 and 805).

(5) When the connection attempt fails the system reports the failure to the connection control unit 110, which then conducts retries according to the retry count memorized in the storage unit 109 (step 806).

The event notifying operation of the network station 1 has been described. Referring next to FIG. 5, description will be given of operation of the network management station 2.

As described above, the network management station 2 includes a display 12 to display on the screen thereof such various information items as the states of network stations 1 and failures taking place in the communication network. The network management station 2 periodically issues by the network polling unit 202 polling items or inquiries (including the connecting operation) via the network control unit b 201 to the network stations 1. Each network station 1 receives the inquiry by the network management unit 102 and then sends response data indicating the current state of the network station 1. The network management station 2 analyzes by the network polling check unit 202 the response data from the network station 1 to send the obtained data to the display unit 204. The display unit 204 converts the received data into a predetermined display signal to transmit the converted data to the display 12. Based on information contained in the data, the display 12 presents an image on the screen.

Referring now to FIG. 12, description will be given of data items corresponding to the inquiries and responses above. In the polling data from the network management station 2, the event notification identifier field 1202, the network station address field 1203, and the auxiliary information field 1205 respectively contain an identifier indicating that the pertinent item is a polling message, an address of the network management station 2, and a point of polling time. In the response data from the network station 1, these fields 1202, 1203, and 1205 respectively include an identifier denoting the items are a response, an address of the network station 1, and a point of response time, state information of the network station 1, etc. For the ordinary data including the polling and response data, the event notification command field 1204 is not used. The polling data is related to the state inquiries 905, 907, and 909, whereas the reply data is associated with the state responses 906 and 908.

Subsequently, the event 1201 of the power-off or power-on state from the network station 1 is received by the network control unit b 201 and is then accepted and analyzed by the event receiver 1201. The event is then outputted to the display unit 204 to be converted into a signal. The signal is presented on the screen of the network control unit 2, for example, by changing a display color of graphical data being currently displayed or in the form of a message. As a result, the converted signal is presented on the display 12 to notify, for example, the power-off of the network station 1.

As above, since the network management station 2 is periodically issuing inquiries to the network stations 1, in a case where, for example, the communication between the network station 1 and the network management station 2 becomes impossible without notification of the power-off of the network station 1, a network failure can be recognized. Accordingly, the failed state of the network is resultantly displayed by the display 12.

In the display color change by the display 12, there may be conducted, for example, an operation to change the display color from green to yellow as well as from green to red on the screen when the event notifying the power-off of the network station 1 and the network failure are respectively received by the network management station 2. This will enable the monitoring operator to determine the system condition. In addition to the display color change, there may be used other output methods of notifying the state to the operator, for example, to sound a particular tone or to print out a pertinent message. In the description, the CPU 10 is provided with the separate programs respectively for the display unit 204 and the display 12. However, since screen images are displayed on the screen by the display 12 according to information of display colors and the like generated the display unit 204, the following description will be given on assumption that the programs above are substantially identical to each other.

Figure 9:
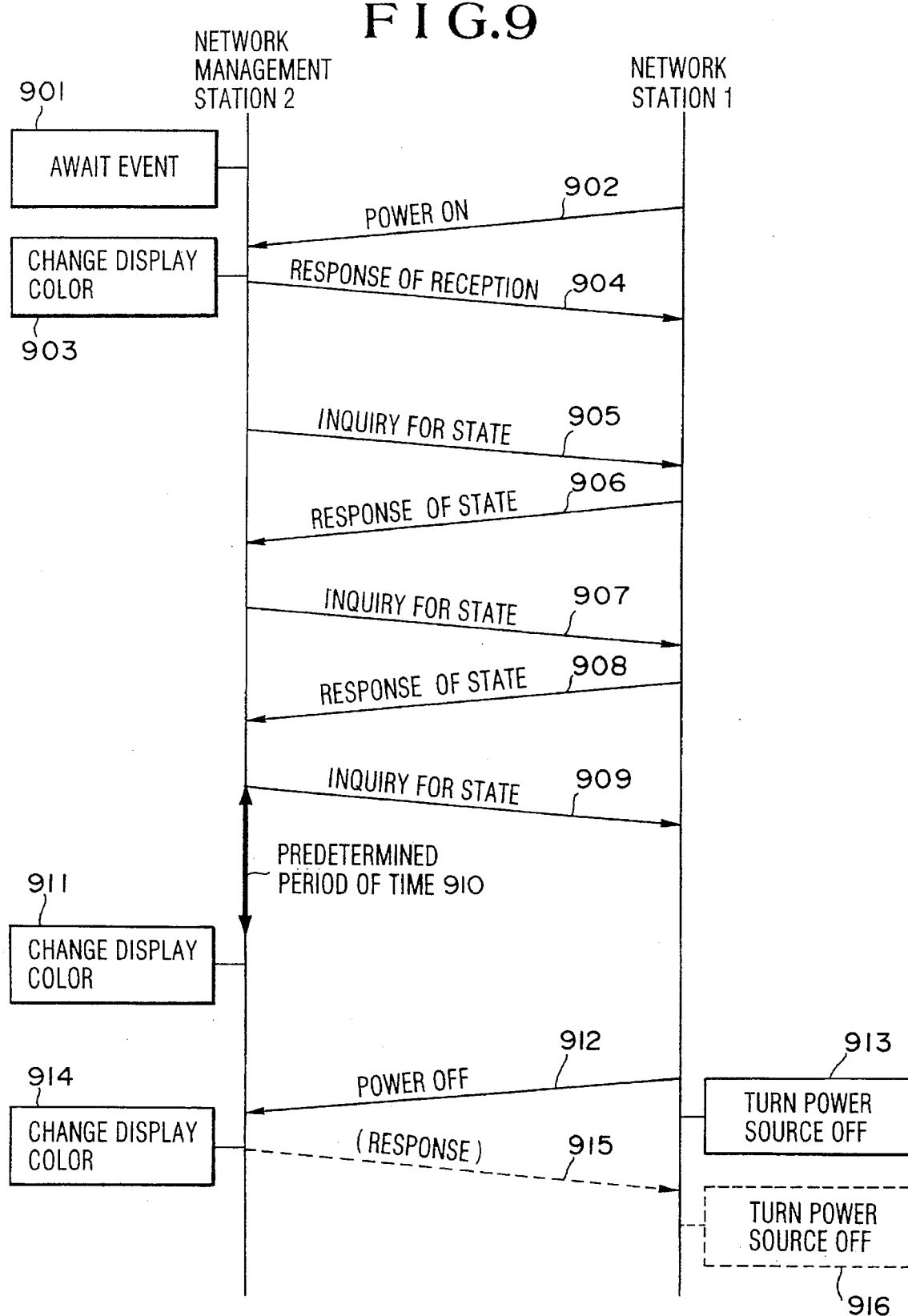
FIG. 9 is an operational timing chart showing operations between the network station and the network management station.

Summarizing the description above, communications between the network station 1 and the network management station 2 will be described by reference to the operational timing chart of FIG. 9.

Ordinarily, the network management station 2 awaits an event message 1201 from the network station 1 by the event receiver 203 (step 901).

At the power-on state, the network station 1 sends the power-on event 1201 to the network management station 2. On receiving the event 1201, the event receiver 203 of the network management station 2 indicates a display color change to the display unit 204 and transmits a response signal indicating the reception of the event 1201 to the network station 1 (step 904).

As the alteration of the display color (step 903), the display unit 204 presents, for example, the display image in blue for the network station 1 in the ordinary state other than the inquiry state (step 901). When the power-on event 1201 is received from the network station 1 (step 902), the event receiver 203 indicates a display color change from blue to green such that the display unit 204 accordingly varies the display color.

To the network stations 1 having issued the power-on event (step 902), the network management station 2 periodically issues inquiries for states thereof (steps 905, 907, and 909). However, it may also be possible to beforehand specify the network stations 1 to which inquiries are to be issued (the network stations 1 are registered by the network management station 2) such that the network management station 2 sends inquiries thereto regardless of the notification of the power-on or power-off event.

In response to the inquiry, the network station 1 sends state information thereof to the network management station 2 (steps 906 and 908).

In ordinary cases, inquiries and responses are exchanged between the network stations 1 and the network management station 2. Description will now be given of the operation in relation to a network failure. After sending the state inquiry to the network station 1 (step 909), the network management station 2 awaits a response therefrom. If no response is receiver within a predetermined period of time thereafter (step 910), a network failure is assumed. The network polling check unit 202 indicates a display color change to the display unit 204, thereby resultantly changing the display color on the display 12 (step 911).

Next, description will be given of the power-off processing in this system.

According to the first method, the network station 1 reports a power-off notification in the power-off operation according to the flowchart of FIG. 7 (step 912) so as to indicate the power source 8 to stop power, thereby interrupting power (step 913). In response thereto, the network management station 2 indicates alteration of the display color according to the event 1201 designating the power-off state (step 914).

In the second method, as indicated by dotted lines, the network management station 2 sends, in addition to a signal instructing the display color change (step 914), a response signal notifying a successful reception of the event 1201 to the network station 1 (step 915). Only when the response signal is received, the network station 1 instructs the power source 8 to stop power (step 916).

Figure 10:
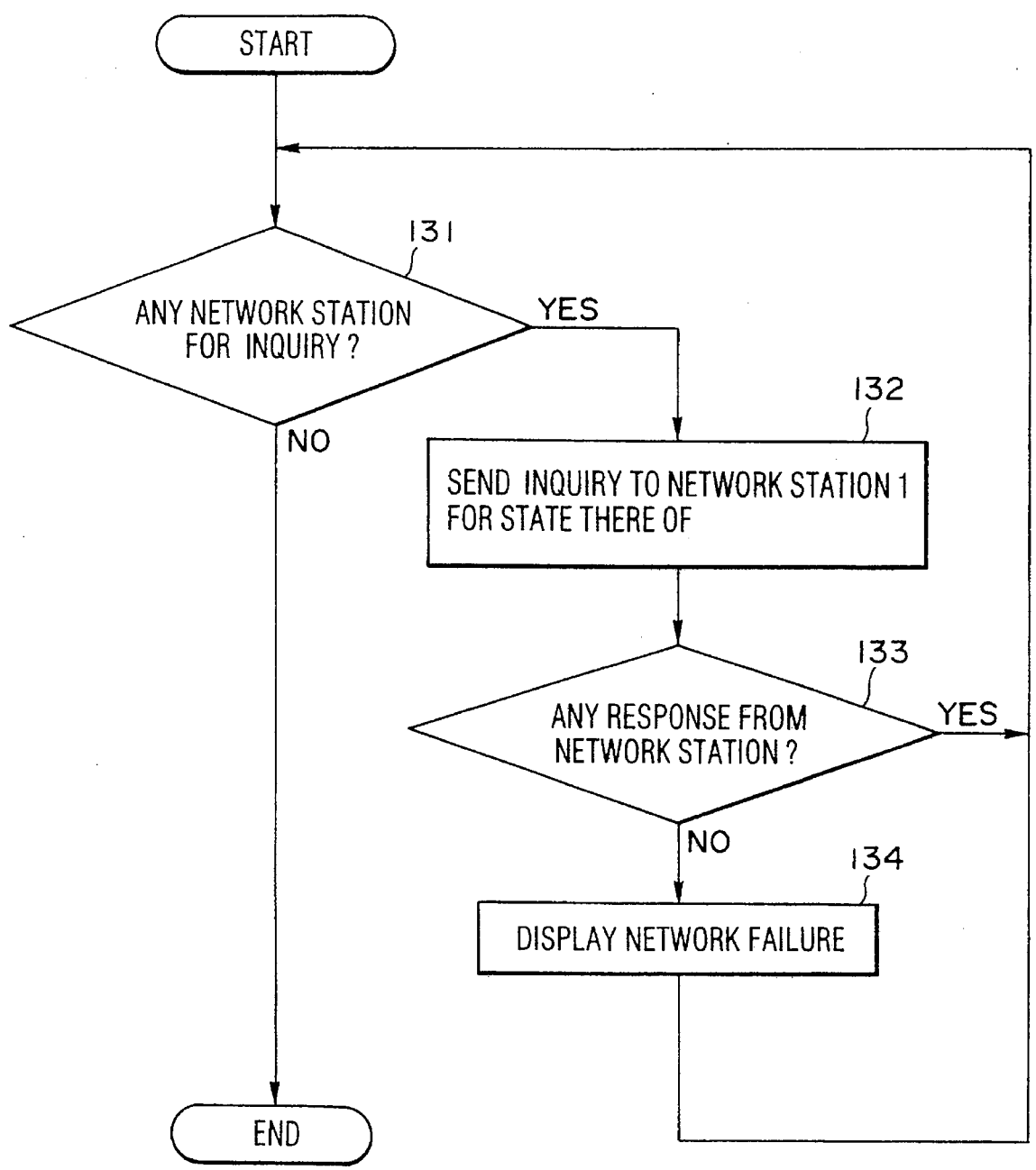
FIG. 10 is a flowchart showing a flow of inquiry or polling from the network management station to the network station.
Figure 11:
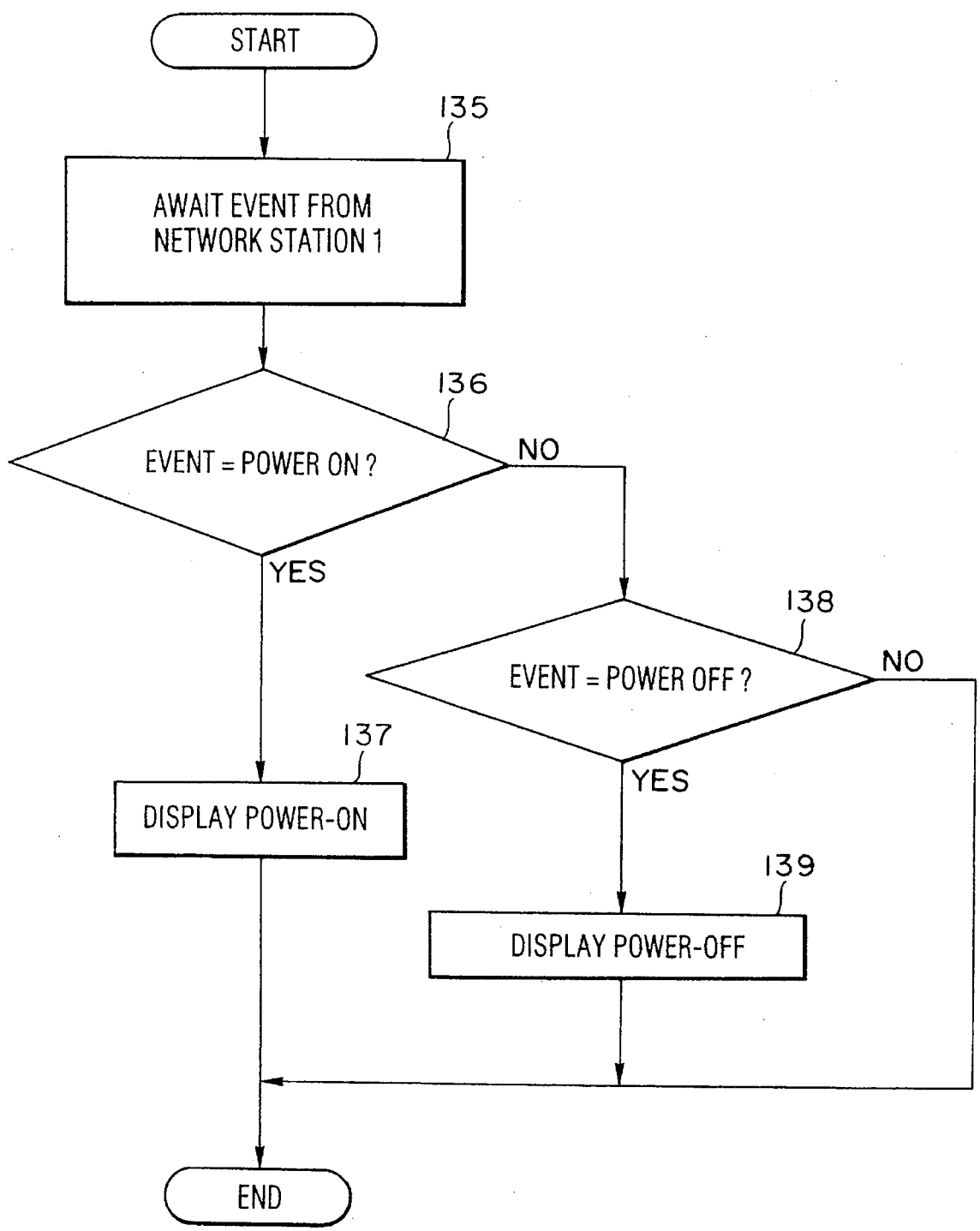
FIG. 11 is a flowchart showing an operation to notify an event from the network station to the network management station.

According to the description above, the processing flow of the network management station 2 will be described by reference to the polling flow of polling operation to the network stations 1 FIG. 10) and the event notification flow of notification from the network station 1 (FIG. 11).

First, referring to FIG. 10, description will be given of the polling operation from the network management station 2 to the network stations 1.

(1) The network management station 2 checks by the network polling check unit 202 to determine whether or not there exists any network station 1 to which the polling is to be conducted (step 131).

(2) When such a network station 1 is missing, the polling is skipped; otherwise, polling information is sent to the pertinent network station 1 (step 132).

(3) When a response to the polling is received from the network station 1 within the predetermined period of time (corresponding to the period 910 of FIG. 9), no particular action is taken and a check is made to decide whether or not there exists any other network station 1 for the polling. If the response is missing, a network failure is assumed and the failed condition is presented on the screen by the display 12 (steps 133 and 134).

Referring now to FIG. 11, description will be given of the event report from the network station 1 to the network management station 2.

(1) The network management station 2 is in a state waiting for an event notification from the network stations 1 (step 135).

(2) On receiving the notification of the event 1201 from the network station 1, an examination is conducted to decided whether or not the contents of the event 1201 indicates a power-on state (step 136). If this is the case, the pertinent state is displayed on the screen by the display 12; otherwise, a check is made to determine whether or not the event 1201 designates a power-off state (step 138).

(3) When the contents of the event 1201 designate the power-off state, the power-off condition is presented on the screen by the display 12 (step 139). In other cases, the processing is terminated without conducting any special action.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A network station connected to a communication network, the communication network being connected to a network management station, the network station comprising:

a power source;

a power switch for controlling power-on and power-off of the power source;

power control means for sensing a power-off state of the power switch, generating an event representing the power-off state, and outputting the even and a generation end signal indicating a complete creation of the event;

storage means for storing therein an address of the network management station;

connection control means electrically connected to the power control means and the storage means for receiving the generation end signal outputted from the power control means, acquiring the address of the network management station from the storage means, and issuing a connection request to establish connection between the network station and the network management station; and network control means electrically connected to the power control means and the connection control means for enabling, in response the connection request issued from the connection control means, communication between the network station and the network management station, and transmitting to the network management station the event outputted from the power control means.

2. A network station according to claim 1, wherein the power control means includes:

power-off detector means for sensing the power-off state and outputting a power-off sense signal;

power management means electrically connected to the connection control means and the power-off detector means for generating the event according to the power-off sense signal, outputting the generation end signal to the connection control means, and outputting the event to the destination after communication between the network station and the network management station is enabled; and event generator means electrically connected between the network control means and the power management means for transmitting to the network control means the event outputted from the power management means.

3. A network station according to claim 2, further comprising network management means electrically connected to the network control means for receiving via the network control means inquiry information sent from the network management station to the network station, and transmitting information of a state of the network station as a reply to the inquiry information via the network control means to the network management station.

4. A network station according to claim 2, wherein the storage means stores therein a retry count of retries to the network management station;
   wherein the network control means notifies, when an attempt to establish connection between the network station and the network management station fails, the failure of connection to the connection control means; and
   wherein the connection control means obtains the retry count from the storage means in response to the connection failure and issues the connection request to the network control means according to the retry count.

5. A network station according to claim 2, wherein the power source supplies power to the network station;
   wherein the event generator means outputs to the power management means a termination of transmission of the event to the network control means; and
   wherein the power management means indicates in response to the termination of transmission the power source to interrupt power.

6. A network station according to claim 2, wherein the power source supplies power to the network station;
   wherein the network control means receives a response signal sent from the network management station, the response signal indicating arrival of the event at the network management station and outputs the response signal to the event generator means;
   wherein the event generator means outputs the response signal to the power management means; and
   wherein the power management means indicates in response to the response signal the power source to interrupt power.

7. A network station according to claim 1, further comprising network management means electrically connected to the network control means for receiving via the network control means inquiry information sent from the network management station to the network station, and transmitting information of a state of the network station as a reply to the inquiry information via the network control means to the network management station.

8. A network station according to claim 1, wherein the storage means stores therein a retry count of retries to the network management station;
   wherein the network control means notifies, when an attempt to establish connection between the network station and the network management station fails, the failure of connection to the connection control means; and
   wherein the connection control means obtains the retry count from the storage means in response to the connection failure and issues the connection request to the network control means according to the retry count.

9. A network station according to claim 1, wherein the power source supplies power to the network station; and
   wherein the power control means indicates the power source to interrupt power after transmitting the event to the network control means.

10. A network station according to claim 1, wherein the power source supplies power to the network station;
    wherein the network control means receives a response signal sent from the network management station, the response signal indicating arrival of the event at the network management station and outputs the response signal to the power control means; and
    wherein the power control means indicates in response to the response signal the power source to interrupt power.

11. A network station according to claim 1, wherein the communication network includes a plurality of mutually connected data lines.

12. A network station according to claim 1, wherein the communication network is a public network.

13. A network station according to claim 1, wherein the communication network is connected to a second network management station;
    wherein the storage means stores therein an address of the second network management station; and
    wherein when the network management station fails, the network control means enables, in response to the connection request issued from the connection control means, communication between the network station and the second network management station, and transmits the event to the second network management station.

14. A network station connected to a communication network, the communication network being connected to a network management station, the network station comprising:
    a bus;
    a CPU connected to the bus;
    storage means connected to the bus;
    a communication processor connected to the bus and the communication network;
    a power source electrically connected to the bus for supplying power via power lines to the CPU, the storage means, and the communication processor; and
    a power switch connected to a signal line to the CPU for notifying a power-off interruption signal to the CPU;
    wherein the CPU includes means responsive to the interruption signal for creating an event representing the power-off state;
    wherein the storage means includes a network management station address storage area for storing therein an address of the network management station;
    wherein the CPU includes means for acquiring the address of the network management station from the network management station address storage area and outputting to the communication processor the address of the network management station and a connection indication to establish connection between the network station and the network management station;
    wherein the communication processor includes means responsive to the connection indication and the address of the network management station for enabling communication between the network station and the network management station, and notifying the CPU of a termination report indicating a communication ready state;
    wherein the CPU includes means responsive to the termination report for outputting to the communication processor the event and a transmission indication to transmit the event to the network management station; and
    wherein the communication processor includes means responsive to the transmission indication for transmitting the event to the network management station.

15. A network station according to claim 14, wherein the CPU includes means for indicating the power source to interrupt power after outputting the event and the transmission indication to the communication processor; and wherein the power source includes means responsive to the interruption indication from the CPU for interrupting supply of power to the CPU, the storage means, and the communication processors.

16. A network station according to claim 14, wherein the communication processor includes means for receiving from the network management station a response signal for the event transmitted from the network station to the network management station and outputting the response signal to the CPU;

wherein the CPU includes means responsive to the response signal for indicating the power source to interrupt power; and wherein the power source includes means responsive to the interruption indication from the CPU for interrupting supply of power to the CPU, the storage means, and the communication processors.

17. A network management system for managing a network, the network management system comprising:

a communication network;

a network station connected to the communication network; and a network management station for monitoring he network station, the network management station being connected to the communication network;

wherein the network station includes a power source, a power switch for controlling power-on and power-off of the power source, power control means for sensing a power-off state of the power switch, generating an event representing the power-off state, and outputting the event and a generation end signal indicating a complete creation of the event, storage means for storing therein an address of the network management station, connection control means electrically connected to the power control means and the storage means for receiving the generation end signal outputted from the power control means, acquiring the address of the network management station from the storage means, and issuing a connection request to establish connection between the network station and the network management stations, and first network control means electrically connected to the power control means and the connection control means for enabling, in response to the connection request issued from the connection control means, communication between the network station and the network management station, and transmitting to the network management station the event outputted from the power control means; and wherein the network management station includes second network control means for enabling, in response to the request from the network station, communication between the network station and the network management station, event receiver means electrically connected to the second network control means for receiving the event outputted from the network station, analyzing the received event, and outputting an indication signal corresponding to the event, and output means electrically connected to the event receiver means for outputting the power-off indication in response to the indication signal outputted from the event receiver means.

18. A network management system according to claim 17, wherein the power control means includes:

power-off detector means for sensing the power-off state and outputting a power-off sense signal;

power management means electrically connected to the connection control means and the power-off detector means for generating the event in response to the power-off sense signal, outputting the generation end signal to the connection control means, and outputting the event after communication is enabled between the network station and the network management station; and event generator means electrically connected between the network control means and the power management means for transmitting to the first network control means the event outputted from the power management means.

19. A network management system according to claim 18, wherein the power source supplies power to the network station;

wherein the event generator means outputs to the power management means a termination of transmission of the event to the first network control means; and wherein the power management means indicates in response to the termination of transmission the power source to interrupt power.

20. A network management system according to claim 17, further comprising network management means electrically connected to the first network control means for receiving via the first network control means inquiry information sent from the network management station to the network station and replying information of a state of the network station as a response to the inquiry information via the first network control means to the network management station.

21. A network management system according to claim 17, wherein the storage means stores therein a retry count of retries to the network management station;

wherein the first network control means notifies, when an attempt to establish connection between the network station and the network management station fails, the failure to the connection control means; and wherein the connection control means obtains the retry count from the storage means in response to the connection failure and issues the connection request to the first network control means according to the retry count.

22. A network management system according to claim 17, wherein the power source supplies power to the network station; and wherein the power control means indicates the power source to interrupt power after transmitting the event to the first network control means.

23. A network management system according to claim 17, wherein the power source supplies power to the network station;

wherein the event receiver means is responsive to the event for outputting a response signal to the second network control means;

wherein the second network control means transmits the response signal via the communication network to the network station;

wherein the first network control means receives the response signal and outputs the response signal to the power control means; and wherein the power control means is responsive to the response signal for indicating the power source to interrupt power.

* * * * *